(12) United States Patent
Biedermann

(10) Patent No.: US 6,393,268 B1
(45) Date of Patent: May 21, 2002

(54) METHOD FOR MAKING EMERGENCY CALLS CORDLESS TELECOMMUNICATIONS SYSTEMS

(75) Inventor: Rolf Biedermann, Ahaus (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/254,767
(22) PCT Filed: Sep. 5, 1997
(86) PCT No.: PCT/DE97/01977
§ 371 Date: Mar. 11, 1999
§ 102(e) Date: Mar. 11, 1999
(87) PCT Pub. No.: WO98/11742
PCT Pub. Date: Mar. 19, 1998

(30) Foreign Application Priority Data

Sep. 11, 1996 (DE) .......................................... 196 38 170

(51) Int. Cl.[7] ................................................. H04Q 7/38
(52) U.S. Cl. ......................... 455/404; 455/465; 455/464
(58) Field of Search ................................. 455/404, 465, 455/464, 455, 462

(56) References Cited

U.S. PATENT DOCUMENTS

| | | | |
|---|---|---|---|
| 5,280,541 A | * 1/1994 | Marko | 379/61 |
| 5,596,625 A | * 1/1997 | LeBlanc | 379/60 |
| 5,678,188 A | * 10/1997 | Hisamura | 455/34.1 |
| 5,946,627 A | * 8/1999 | Desseignes | 455/465 |
| 5,978,687 A | * 11/1999 | Maenpaa | 455/555 |

* cited by examiner

Primary Examiner—Thanh Congle
Assistant Examiner—Nick Corsaro
(74) Attorney, Agent, or Firm—Bell, Boyd & Lloyd LLC

(57) ABSTRACT

A method for making emergency calls in cordless telecommunications systems, in particular DECT/GAP systems, wherein in order to be able to make emergency calls is proposed, which allows for the fact that the contains mobile parts which do or do not have access authorization to base stations, such that to an emergency call connection occurs in all cases.

16 Claims, 5 Drawing Sheets

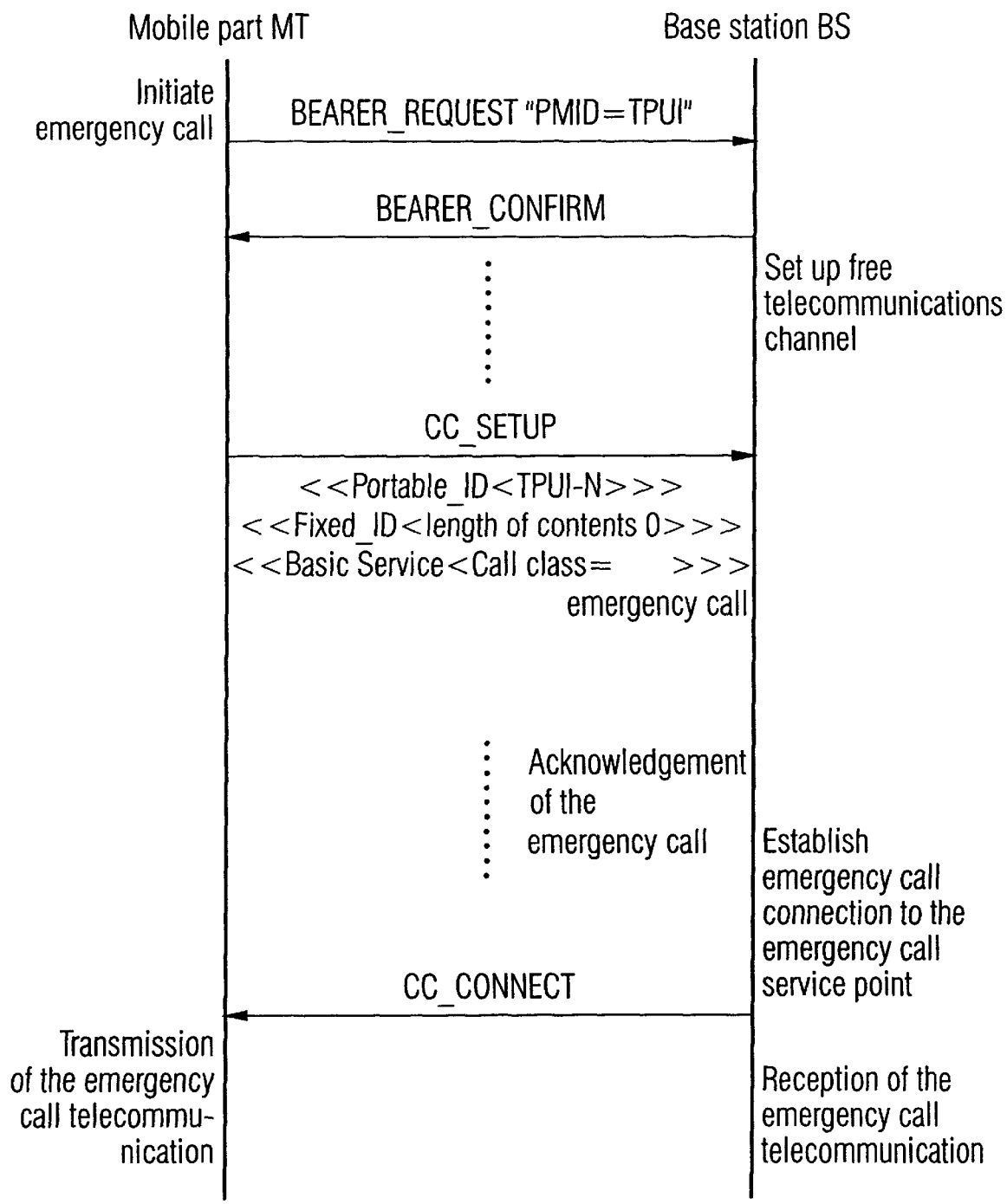

METHOD FOR MAKING EMERGENCY CALLS CORDLESS TELECOMMUNICATIONS SYSTEMS

BACKGROUND OF THE INVENTION

1. Field of the Invention

The present invention relates to a method for making emergency calls in cordless telecommunications systems by means of a special emergency call transmission procedure wherein an emergency call connection is made regardless of whether the system contains mobile parts which do or do not have access authorization to base stations.

2. Description of the Prior Art

In telecommunications systems with a telecommunication transmission link between a telecommunication source and a telecommunication sink, transmission and reception units are used for processing and transmitting telecommunications, in such units:

1) it is possible for the processing and transmission of telecommunications to take place in a preferred transmission direction (simplex mode) or in both transmission directions (duplex mode);
2) the processing of telecommunications is analog or digital;
3) the transmission of telecommunications via the long-distance transmission link takes place wirelessly on the basis of various telecommunications transmission methods such as FDMA (Frequency Division Multiple Access), TDMA (Time Division Multiple Access) and/or CDMA (Code Division Multiple Access); for example, according to radio standards such as DECT, GSM, WACS or PACS, IS-54, PHS, PDC etc. [cf. IEEE Communications magazine, January 1995, pages 50 to 57; D. D. Falconer et al: "Time Division Multiple Access Methods for Wireless Personal Conmunications"] and/or in a wirebound fashion.

"Telecommunication" is a superordinate term which stands both for the signal contents (information) and for the physical representation (signal). Despite a telecommunication having the same content—that is to say the same information—different signal forms may occur. Thus, for example, a telecommunication relating to an object can be transmitted (1) in the form of an image, or
(2) as a spoken word,
(3) an a written word,
(4) as an encrypted word or image.

The method of transmission according to (1) . . . (3) is normally characterized by continuous (analog) signals, whereas in the transmission method according to (4) discontinuous signals (e.g., pulses, digital signals) are usually produced.

Cordless telecommunications systems of the type defined above are, for example, DECT systems [Digital Enhanced (earlier: European) Cordless Telecommunication; cf. (1): Nachrichtentechnik Elektronik. [Telecommunications electronics] 42 (1992) January/February No. 1, Berlin, DE; U. Pilger "Struktur des DECT-Standards" [Structure of the DECT Standard], pages 23 to 29 in conjunction with the ETSI publication ETS 300175-1 . . . 9, October 1992; (2): Telecom Report 16 (1993), No. 1, J. H. Koch: "Digitaler Komfort für schnurlose Telekommunikation—DECT-Standard eröffnet neue Nutzungagobietes" [Digital convenience for cordless telecommunications—DECT standard opens up new fields of use], pages 26 and 27; (3): tec February, 1993—Das technische Magazin von Ascom "Wege zur universellen mobilen Telekommunikation" [The technical magazine from Ascom "Ways toward universal mobile telecommunications], page 35 to 42; (4): Philips Telecommunication Review, Vol. 49, No. 3, September 1991, R. J. Mulder: "DECT, a universal cordless access systems"; (5): WO 93/21719 (FIGS. 1 to 3 with associated description)] or GAP systems (Generic Access Profile; ETSI publication prETS 300444, April 1995, Final Draft, ETSI, FR), which may be designed, for example, in accordance with the illustration in FIG. 1.

The GAP Standard is a subset of the DECT Standard and has the function of ensuring the interoperability of the DECT air interface, in particular, for public telecommunications applications.

Where DECT/GAP systems are referred to below, private and/or public systems are thus meant.

According to the DECT/GAP standard, it is possible, in accordance with the illustration in FIG. 1, to set up at a DECT/GLP base station BS a maximum of 12 connections according to the TDMA/FDMA/TDD method (Time Division Multiple Access/Frequency Division Multiple Access/Time Division Duplex) in parallel to DECT/GAP mobile parts MT1 . . . MT12 over a DECT/GAP air interface configured for the frequency range between 1.88 and 1.90 GHz. The number 12 results from the number "k" of time slots or telecommunications channels (k=12) available for the duplex mode of a DECT/GAP system. The connections here may be internal and/or external. When there is an internal connection, two mobile parts registered at the base station BS, for example the mobile part MT2 and the mobile part MT3, can communicate with one another. To set up an external connection, the base station BS is connected to a telecommunications network TKN, for example in line-bound form via a telecommunications connection unit TAE and/or a private branch exchange system NStA with a line-bound telecommunications network or, in accordance with WO 95/05040, in wireless form as a repeater station with a superordinate telecommunications network. When there in an external connection, it is possible to use a mobile part, for example the mobile part MT1, to communicate with a subscriber in the telecommunications network TKN via the base station BS, the telecommunications connection unit TAE or the private branch exchange system NStA. If the base station BS has, as in the case of the Gigaset 951 (Siemens cordless telephone, cf. Telcom report 16, (1993) Issue 1, pages 26 and 27), only one connection to the telecommunications connection unit TAE and/or to the private branch exchange system NStA, only one external connection can be set up. If the base station BS has, as in the case of the Gigaset 952 (Siemens cordless telephone; cf. Telcom report 16, (1993), issue 1, pages 26 and 27), two connections to the telecommunications network TKN, a further external connection, in addition to the external connection to the mobile part MT1, is possible from a line-bound telecommunications terminal TKE which is connected to the base station BS. In this context, it is in principle also conceivable for a second mobile part, for example the mobile part MT12, to use the second port for an external connection, instead of the telecommunications terminal TEE. While the mobile parts MT1 . . . MT12 are operated with a battery or an accumulator, the base station BS which is designed as a cordless small-scale exchange is connected to a voltage network SPN via a mains connection unit NAG.

FIG. 2 shows, on the basis of the publication Components 31 (1993), Issue 6, pages 215 to 218; S. Althammer, D. Br ückmann: "Hochoptimierte IC's für DECT- Schnurlostelefone" [Highly optimized ICs for DECT cordless telephones] the basic circuitry design of the base station BS and of the mobile part MT. According to the latter, the base station BS and the mobile part MT have a radio component FKT (with an antenna ANT which is assigned to transmitting and receiving radio signals) a signal processing device SVE and a central controller ZST which are connected to one another in the illustrated way. The radio component PXT contains such known devices such as a transmitter SE, a receiver EM and a synthesizer SYN. The signal processing device SVE contains, inter alia, a coding/decoding device CODEC. The central controller ZST has a microprocessor $\mu$P, both for the base station BS and for the mobile part MT, with a program module PGM set up according to the OSI/ISO layer model [cf. (1): Instruction sheets—Deutsche Telekom, year 48, February 1995, pages 102 to 111; (2): ETSI publication ETS 300175-1 . . . 9, October 1992], a signal control component SST and a digital signal processor DSP, which are connected to one another in the way illustrated. Of the layers defined in the layer model, only the directly essential first four layers are illustrated for the base station BS and the mobile part MT. The signal control component SST is designed as a Time Switch Controller TSC in the base station BS and as a Burst Mode Controller BMC in the mobile part MT. The essential difference between the two signal control components TSC, BMC consists in the fact that the base station-specific signal control component TSC additionally assumes switching functions in comparison with the mobile part-specific signal control component BMC.

The principal method of operation of the circuit units specified above is described, for example, in the publication Components 31 (1993), Issue 6, pages 215 to 218, cited above.

The described circuitry design according to FIG. 2 is supplemented in the base station BS and the mobile part MT in accordance with their function in the DECT/GAP system according to FIG. 1 by means of additional function units.

The base station BS is connected to the telecommunications network TKN via the signal processing device SVE and the telecommunications connection unit TAE or the private branch exchange system NStA. As an option, the base station BS also can have a user interface (functional units shown with broken lines in FIG. 2), which includes, for example, an input device EE designed as a keypad, a display device AE designed as a display, a hand-held unit SHE designed as a handset with microphone MIF and earphone HK, as well as a ringer TRK.

The mobile part MT has a user interface which is possible with the base station BS as an option and which has the control elements described above, that are associated with this user interface.

FIG. 3 shows, taking the DECT system according to FIG. 1 as a starting point, a cellular DECT/GAP multisystem CMI (Cordless Multicell Integration) in which a plurality of the DECT/GAP systems TKS described above, each with one base station BS and one or more mobile parts MT present at a given geographical location for example a concentrated (in a "hot spot" arrangement) in an administration building with large open-plan offices. However, instead of an "enclosed" geographical location, such as the administration building, an "open" geographical location with strategic telecommunication significance, for example squares in large cities with a high traffic volume, a large collection of commercial units and large volumes of people moving, is also possible for the installation of a cellular DECT/GAP multisystem CMI. A number of the base stations BS arranged in the open-plan office are designed here as antenna diversity base stations, in contrast to the base stations according to WO 95/10764 shown in FIGS. 1 and 2, as. The concentration of the DECT/GAP systems TKS is so marked here (uninterrupted radio coverage of the geographical location), that individual DECT/GAP systems TKS operate in the same area as a result of the overlapping cellular DECT/GAP radio cells FB.

Depending on the degree of overlapping, the same area may mean that a) a first base station BS1 of a first telecommunications system TKS1 is arranged in a first radio cell FB1 and a second base station BS2 of a second telecommunications system TKS2 is arranged in a second radio cell FB2 and can set up telecommunications connections to at least one mobile part $MT_{1,2}$ b) a third base station BS3 of a third telecommunications system TKS3 and a fourth base station BS4 of a fourth telecommunications system TKS4 are arranged in a common third radio cell FB3 and can set up telecommunications connections to at least one mobile part $MT_{3,4}$.

FIG. 4 shows, using FIGS. 1 to 3 as a basis and with reference to the publication "Nachrichtentechnik Elektronik [Telecommunications Electronics] 42 (1992) January/February, No. 1, Berlin, DE; U. Pilger: "Struktur des DECT-Standards" [Structure of the DECT Standard], pages 23 to 29 in conjunction with ETS 300175-1 . . . 9, October 1992" the TDMA structure of the DECT/GKP system TKS. The DECT/GAP system is a hybrid system in terms of the multiple access methods in which, the FDMA principle, it is possible to transmit radio telecommunications on ten frequencies in the frequency band between 1.88 and 1.90 GHz from the base station BS to the mobile part MT from the mobile part MT to the base station BS (Time Division Duplex Mode) according to the TDMA principle in accordance with FIG. 4 in a prescribed time sequence. The time sequence is determined here by a multiple time frame MZR, which occurs every 160 ms and which has 16 time frames ZR, each with a time period of 10 ms. Information which relates to a C-, M-, N, P-, Q-channel defined in the DECT Standard is transmitted separately to the base station BS and mobile part MT in these time frames ZR. If information for a plurality of these channels is transmitted in one time frame ZR, the transmission takes place according to a priority list where M>C>N and P>N. Each of the 16 time frames ZR of the multiple time frame MZR is divided, in turn, into 24 time slots ZS (each with a time period of 417 $\mu$s) of which 12 time slots ZS (time slots 0 . . . 11) are intended for the transmission direction "base station BS→mobile part MT" and a further 12 time slots ZS (time slots 12 . . . 23) are intended for the transmission direction "mobile part MT→base station BS". In each of these time slots ZS, information with a bit length of 480 bits is transmitted in accordance with the DECT Standard. Of these 480 bits, 32 bits are transmitted as synchronization information in a SYNC field and 388 bits are transmitted as useful information in a D field. The remaining 60 bits are transmitted as additional information in a Z field and as protective information in a "guard time" field. The 388 bits of the D field which are transmitted as useful information are in turn divided into a 64 bit-long A field, a 320 bit-long B field and a 4 bit-long "X-CRC" word. The 64 bit-long A field is composed of an 8 bit-long data header, a 40 bit-long data record with data for the C-, Q-, M-, N-, P-channels and a 16 bit-long "A-CRC" word.

Moreover, in addition to the abovementioned DECT/GAP systems, further future cordless telecommunications systems, which are based on the known multiple access methods FTMA, TDMA, CDMA (Frequency Division Multiple Access, Time Division Multiple Access, Code Division Multiple access), and hybrid multiple access methods formed therefrom, are possible for transmitting emergency calls.

For setting up telecommunications connections between the base station or stations BS and the mobile parts MT in the DECT/GAP systems in accordance with FIGS. 1 to 4, the procedure described below is provided, by way of example, in the DECT/GAP standard.

The base station BS (Radio Fixed Part RFP) in accordance with FIGS. 1 to 4 transmits the so-called dummy bearer on simplex transmission paths over the DECT air interface at regular time intervals, wherein the dummy bearer is broadcasting information which is received by the mobile part MT (Radio Portable Part RPP) in accordance with FIGS. 1 to 4 and being used by the latter for the synchronization and the connection set-up with the base station. The broadcast information does not necessarily have to be transmitted on a dummy transmission path (dummy bearer).

It is also possible for there to be no dummy transmission path because the base station already maintains at least one telecommunications connection, a so-called traffic transmission path (traffic bearer), to another mobile part, on which transmission path it then transmits the necessary broadcast information. In this case, the mobile part which wishes to have a telecommunications connection to the base station can receive the broadcast information, as in the case of the transmission of the broadcast information on the dummy transmission path.

The broadcast information contains—in accordance with the ETSI publication ETS 300175-3, October 1992, Chapter 9.1.1.1—information on access rights, system information and paging information.

Furthermore, the system information contains additional information which informs the mobile part whether the base station is a base station via which emergency calls can be transmitted (a subject which was publicly discussed in the ETSI-RES03R Gremium and ETSI-RES03N Gremium in the 1st half of 1996).

If the mobile part has received this additional information and if the respective mobile part also has access rights to the base station transmitting the additional information (for example if the mobile part is signed on and registered with the base station in accordance with WO 94/10785—Patent Claims iVm of the description of FIG. 4), a preconfigured emergency call number is automatically dialed and an emergency call connection is established. Such connection connects to emergency call service points in accordance with a special user interface procedure (for example, dialing of the emergency call number, 112, pressing of an emergency call key, selection of an item of menu information "EMERGENCY CALL" etc.) on the mobile part in accordance with the GAP Standard (cf. ETSI publication prETS 300444, April 1995) based on a set-up procedure for normal (usual) outgoing telecommunications connections via a direct call connection [cf. ETSI publication prETS 300444, April 1995, Chap. 8.10 ("CC_INFO <<MULTI KEYPAD>>)].

The procedure described above, for transmitting emergency calls in a DECT/GAP system, may be sufficient for private systems in which it can be assumed that the mobile parts have an access authorization to base stations. The defined procedure is inadequate, however, for public systems in which the access authorization is perhaps only given in individual cases.

Furthermore, in the procedure described above for transmitting emergency calls in a DECT/GAP system it is not always ensured that the mobile parts with an access authorization can transmit emergency calls to a base station in all cases. Thus, the case may occur in which the respective base station has no free channels any more, for example because of limited channel resources, or must decline a request or a wish for the transmission of an emergency call for other (unusual) reasons (cf. ETSI publication prETS 300444, April 1995, Chap. 8.2.2.3 and Chap. 8.8). The respective mobile part can then search for other base stations via which emergency calls still can be transmitted, but there is no guarantee that this search will be successful.

Furthermore, there remains the problem of how, if in the first place an emergency call has been successfully transmitted from a mobile part via a base station to an emergency service, that is to say an emergency call connection exists, when and who can terminate or clear this existing call connection again.

The transmission of emergency calls in wireless telecommunications systems is known in mobile radio systems in accordance with the GSM Standard (cf. publication by M. Mouly, M-B. Pautet: "The GSM System for Mobile Communications" 1992, Int. Standard Book No. 2-9507190-0-7, pages 49, 453, 437 and 532–535).

The problems discussed above in conjunction with the transmission of emergency calls are not found in these mobile known radio systems.

SUMMARY OF THE INVENTION

The object on which the present invention is based consists in being able to make emergency calls in cordless telecommunications systems, in particular DECT/GAP systems, efficiently and reliably.

The idea on which the present invention is based lies in making emergency calls in cordless telecommunications systems by means of a special emergency call transmission procedure which allows for the fact that the system contains mobile parts which do or do not have access authorization to base stations and with which procedure an emergency call connection is produced in all cases.

Accordingly, in an embodiment of the present invention, a method is provided for making emergency calls in cordless telecommunications systems, wherein the method includes the steps of: initiating emergency calls to emergency call services points at cordless mobile parts using manual interface procedures via cordless base stations connected to the cordless mobile parts by telecommunication; transmitting, with the cordless mobile part, a first telecommunication with an emergency call-specific temporary first identification to the cordless base station; searching, with the mobile part using the telecommunication, at the cordless base station for an emergency call connection to the emergency call service point; distinguishing, with the cordless base station, between a usual communications request and an emergency call using the first identification received; responding, with the cordless base station, to the first telecommunication with a second telecommunication, and ensuring that a free telecommunications channel is set up for the emergency call connection; transmitting, with the cordless mobile part, to the cordless base station a third telecommunication with a first information element containing a call indicator for the emergency call and with a second information element containing a mobile part-specific second identification, and with a third information element containing a zero contents indicator, wherein the third telecommunication causes the cordless base station to set up the emergency call connection to the emergency call service point; and setting up, with the cordless base station, the emergency call connection to the emergency call service point and informing the cordless mobile part of the setting up of the emergency call connection in response to the third telecommunication via a fourth telecommunication.

In an embodiment, the emergency call connection to the emergency call service point is set up by automatically dialing an emergency call number if the first cordless base station is a private cordless base station.

In an embodiment, the emergency call connection to the emergency call service point is set up automatically if the first cordless base station is a public cordless base station.

In an embodiment, the free telecommunications channel is set up for the emergency call connection by reserving one telecommunications channel from a plurality of telecommunications channels available in the cordless base station.

In an embodiment, the free telecommunications channel is set up for the emergency call connection such that if all of the plurality of telecommunications channels available in the cordless base station are occupied, one of the plurality of telecommunications channels is freed.

In an embodiment, the telecommunications channel includes both a radio channel between the cordless base station and the cordless information part and a voice/data channel between the cordless base station and the emergency call service point.

In an embodiment, the established emergency call connection within the cordless telecommunications system is cleared down by the cordless base station.

In an embodiment, the method further includes the steps of: transmitting additional information by cordless base stations wherein the information is received by cordless mobile parts and indicates that the emergency calls can be passed onto the emergency call service points via the cordless base stations; and synchronizing first cordless mobile parts, which receive the additional information from first cordless base stations, and to which the first cordless mobile parts do not have any access authorization, as a precaution for making emergency calls, at least temporarily with the first cordless base stations for a telecommunication which is restricted to making emergency calls.

In an embodiment, the cordless telecommunications system is a DECT/GAP system.

In an embodiment, the cordless telecommunications system is a PHS system.

In an embodiment, the cordless telecommunications system is a WACS system.

In an embodiment, the cordless telecommunications system is a PACS system.

In an embodiment, the cordless telecommunications system is a CDMA system.

In an embodiment, the cordless telecommunications system is a TDMA system.

In an embodiment, the cordless telecommunications system is an FDMA system.

In an embodiment, the cordless telecommunications system is a hybrid system of a CDMA system, a TDMA system and an FDMA system.

Additional features and advantages of the present invention are described in, and will be apparent from, the Detailed Description of the Preferred Embodiments and the Drawings.

DESCRIPTION OF THE DRAWINGS

FIG. 5 shows an emergency call transmission procedure in a DECT/GAP system in accordance with the teachings of the present invention.

DETAILED DESCRIPTION OF THE PREFERRED EMBODIMENTS

Figure 1:
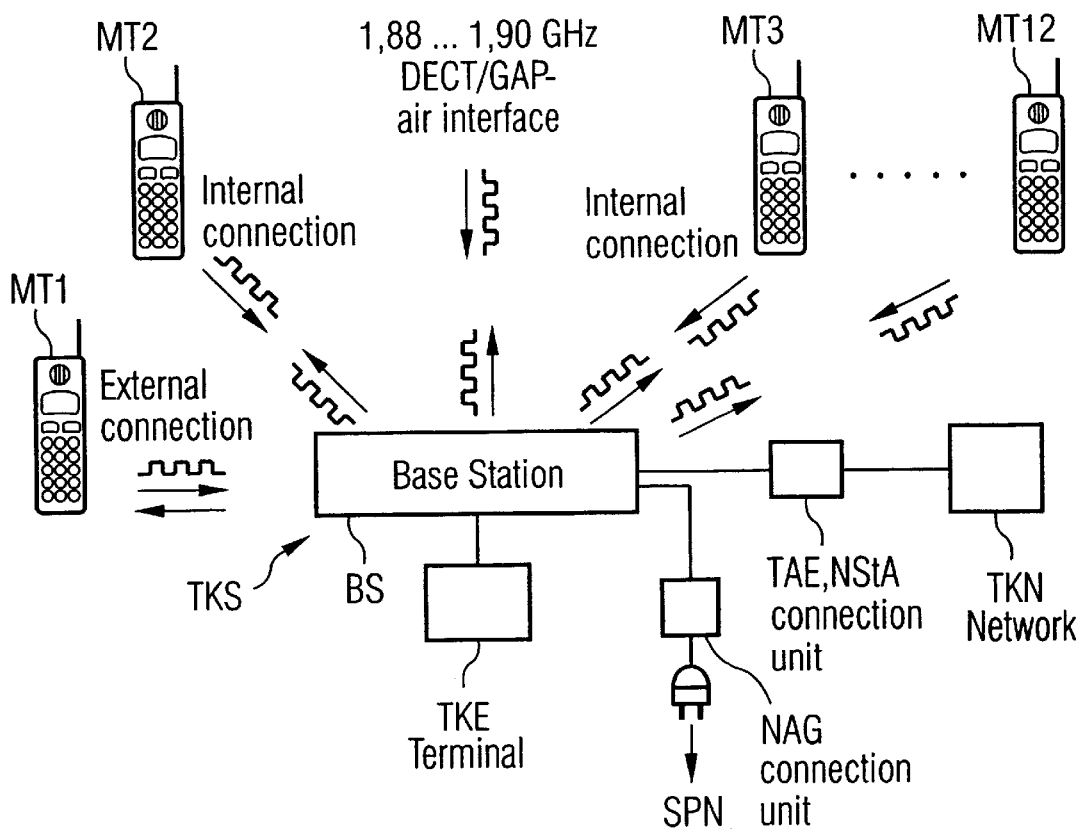
FIG. 1 shows a DECT/GAP base station in parallel with a plurality of DECT/GAP mobile parts.
Figure 2:
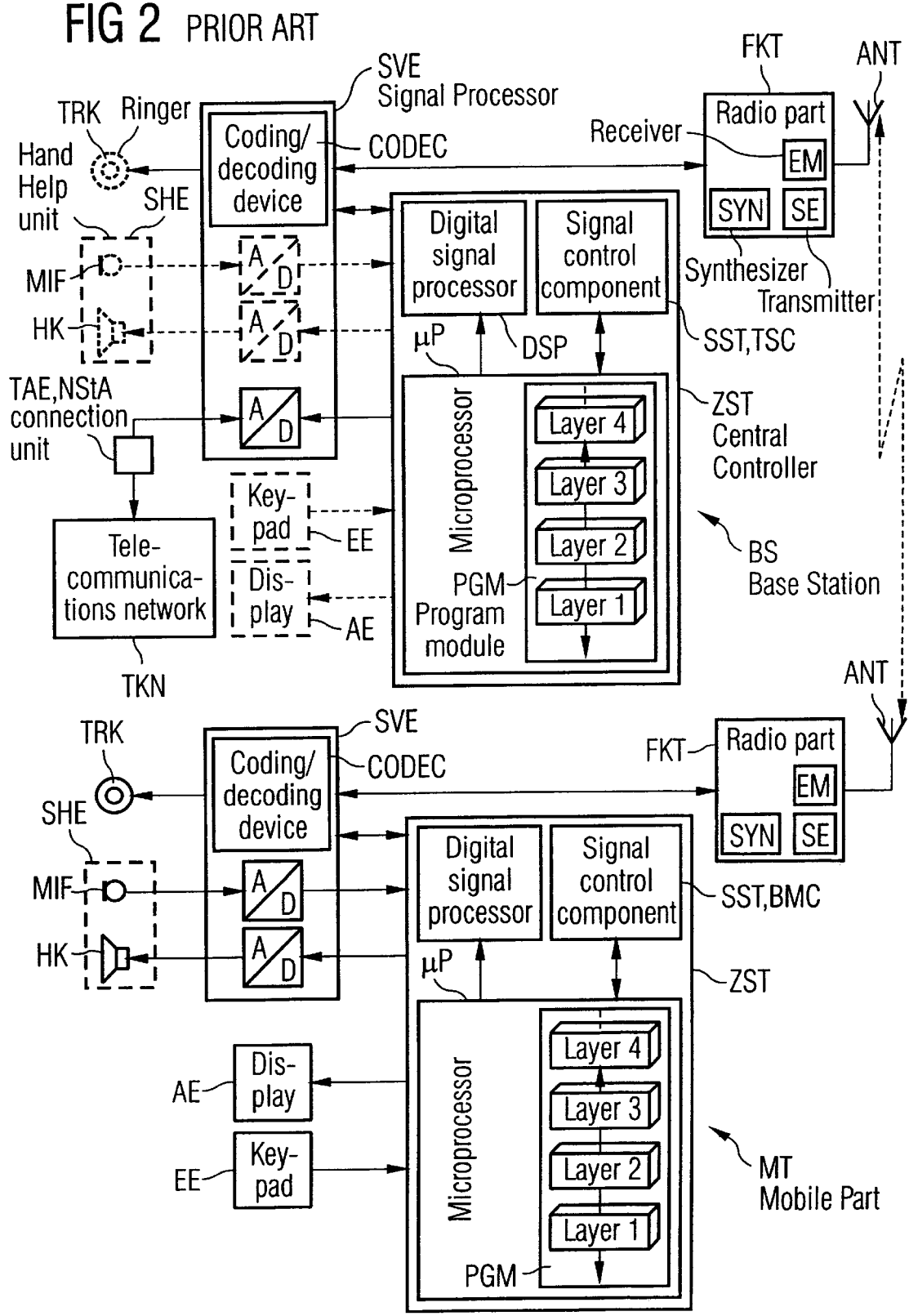
FIG. 2 shows the basic circuitry design of a base station and a mobile part.
Figure 3:
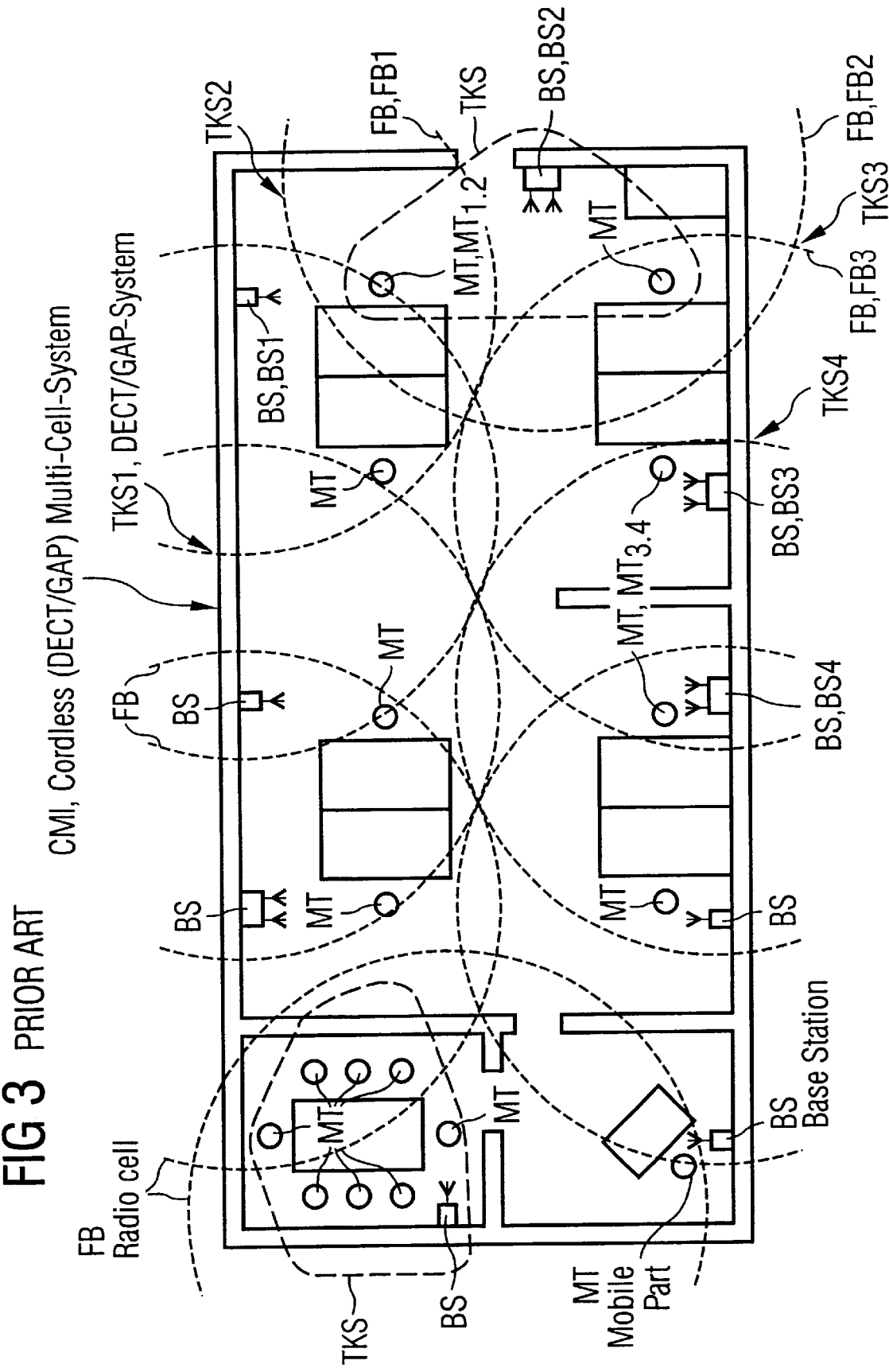
FIG. 3 shows a cellular DECT/GAP multisystem.
Figure 4:
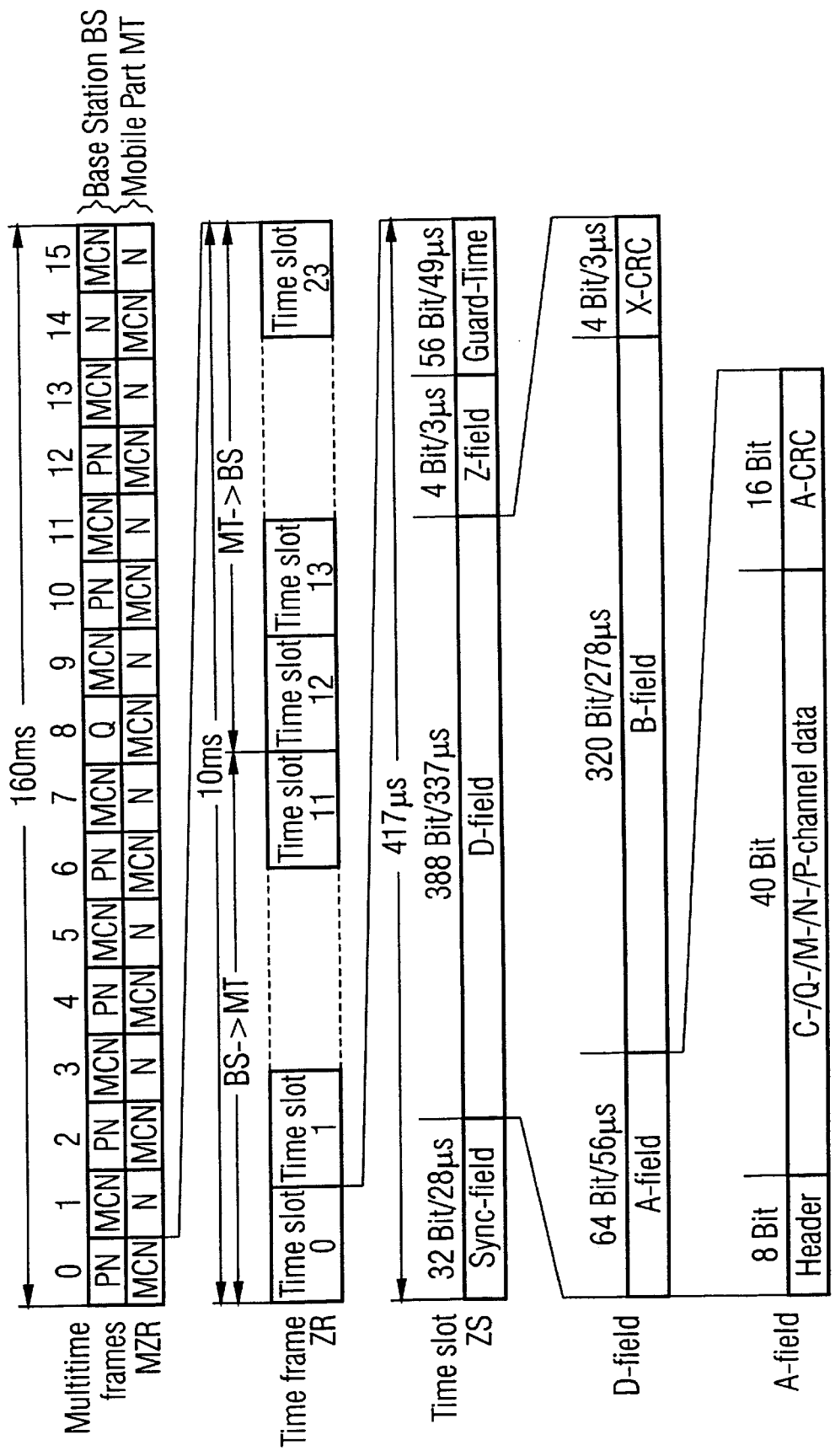
FIG. 4 shows the TDMA structure of a DECT/GAP system.

Before the mobile part MT (portable part) starts the illustrated procedure with the base station BS (fixed part), it should either have (as already mentioned at the beginning) an access authorization to this base station BS or, if this is absent, it should, as a precaution, have synchronized, at least temporarily, with the base station BS for telecommunication which is limited to the transmission of emergency calls. This advance synchronization substantially shortens the clear-down time of an emergency call in an emergency. The synchronization with a base station is achieved in that the latter broadcasts the additional information mentioned at the beginnings within the scope of the transmitted broadcast information. During the search for a base station to which the mobile part does not have any access authorization, it is advantageous if the mobile part first searches for public base stations, because they will broadcast the additional information with greater probability in comparison with private base stations. Thereafter, it searches for private base stations only when such a search has been without success. As a criterion for distinguishing between a public base station and a private base station, there is only the identification ARC (ACCESS RIGHTS CLASS) which is used by the public base stations and which is transmitted significantly more frequently than the additional information.

If the mobile part MT has found a base station BS according to the above criteria, when needed, the transmission of an emergency call is initiated at the mobile part MT by means of, as already mentioned, a manual user interface procedure.

Then, within the scope of a connection set-up procedure (Bearer set-up procedure; cf. ETSI-publication ETS 300175-3, October 1992, Chap. 10.5.1.1.), the mobile part MT transmits to the base station BS a first MAC telecommunication "BEARER_REQUEST" (cf. ETSI publication ETS 300175-3), October 1992, Chap. 7.3.3.2) with the parameter "PMID" (Portable MAC Identifier), to which the parameter "TPUI" (Temporary Portable User Identification; cf. ETSI publication ETS 300175-6, October 1992, chap. 6.3.1) is assigned as an emergency call-specific temporary identification. With this telecommunication specified in this way, the base station BS can distinguish between an emergency call request and a normal call request of the mobile part. An a response to the received first telecommunication, the base station BS transmits a second MAC telecommunication "BEARER_CONFIRM" (cf. ETSI publication ETS 300175-3, October 1992, Chap. 7.3.3.3) to the mobile part MT.

If the base station BS (the MAC protocol layer) has recognized an emergency call request, higher protocol layers, and the protocol layer control (Lower Layer Management Entity LLME) are given the task of setting up a free telecommunications channel. The device can take such a form here that, if all the telecommunications channels available in the base station are seized—a free channel is created by clearing an existing telecommunications connection or a free channel is reserved from the outset. If, in the present case, the channel is a telecommunications channel, both the network-side voice and data channels and the radio channels or time slots are thus meant.

After the free telecommiications channel has been set up, and the mobile part MT has been informed of this, the mobile part MT transmits a first NWK telecommunication "CC-SETUP" (cf. ETSI publication ETS 300175-5, October 1992, Chap. 6.3.2.1) with:

1) the information element "BASIC SERVICE", (cf. ETSI publication ETS 300175-5), October 1992, Chap. 7.6.4) in which the segment "CALL CLASS" has the content emergency call";
2) the information element "PORTABLE IDENTITY" (cf. ETSI publication ETS 300175-5, October 1992, Chap. 7.7.30) and the segment "IPUI-N";
3) the information element "FIXED IDENTITY" (cf. ETSI publication ETS 300175-5, October 1992, Chap. 7.7.18) and the segment "LENGTH OF CONTENTS 0".

The base station BS is intended to accept this NWK telecommunication from the mobile part MT without checking the "FIXED_IDENTITY" and the "PORTABLE_IDENTITY" and to proceed with the NWK protocol layer procedure in accordance with the GAP Standard (cf. ETSI publication prETS 300444, April 1995, Chap. 8.2) without checking NWK protocol layer identification.

After the emergency call has been acknowledged in accordance with the GAP Standard, the base station BS establishes the emergency call connection to the emergency call service points and transmits a second NWX telecommunication "CC-CONNECT" (cf. ETSI-publication ETS 300175-5, October 1992, Chap. 6.3.2.6) to the mobile part MT. The emergency call connection is preferably established here automatically in the case of a public base station and preferably by the automatic dialling of an emergency call number in the case of a private base station.

The actual emergency call telecommunication now can be input directly or indirectly at the mobile part MT. This emergency call telecommunication to the amergency call service passes via the base station B5.

In addition, it is advantageous that, if the emergency call connection exists and the emergency call telecommunication has been transmitted, the existing emergency call connection is cleared again by the base station. In this way it is possible that, in an emergency, for example an accident, the emergency call connection cannot be cleared by inadvertent user interface procedures at the mobile part.

Although the present invention has been described with reference to specific embodiments, those of skill in the art will recognize that changes may be made thereto without departing from the spirit and scope of the invention as set forth in the hereafter appended claims.

We claim:

1. A method for making emergency calls in cordless telecommunications systems, the method comprising the steps of:
    initiating emergency calls to emergency call services points at cordless mobile parts using manual interface procedures via cordless base stations connected to the cordless mobile parts by telecommunication;
    transmitting, with the cordless mobile part, a first telecommunication with an emergency call-specific temporary first identification to the cordless base station;
    searching, with the mobile part using the telecommunication, at the cordless base station for an emergency call connection to the emergency call service point;
    distinguishing, with the cordless base station, between a usual communications request and an emergency call using the first identification received;
    responding, with the cordless base station, to the first telecommunication with a second telecommunication, and ensuring that a free telecommunication channel is set up for the emergency call connection;
    transmitting, with the cordless mobile part, to the cordless base station a third telecommunication with a first information element containing a call indicator for the emergency call, and with a second information element containing a mobile part-specific second identification, and with third information element containing a zero contents indicator, wherein the cordless base station accepts the third telecommunication without checking the second and third information elements and immediately proceeds to set up the emergency call connection to the emergency call service point; and
    setting up, with the cordless base station, the emergency call connection to the emergency call service point and informing the cordless mobile part of the setting up of the emergency call connection in response to the third telecommunication via a fourth telecommunication.

2. A method as claimed in claim 1, wherein the emergency call connection to the emergency call service point is set up by automatically dialing an emergency call number if the first cordless base station is a private cordless base station.

3. A method as claimed in claim 1, wherein the emergency call connection to the emergency call service point is set up automatically if the first cordless base station is a public cordless base station.

4. A method as claimed in claim 1, wherein the free telecommunications channel is set up for the emergency call connection by reserving one telecommunications channel from a plurality of telecommunications channels available in the cordless base station.

5. A method as claimed in claim 1, wherein the free telecommunications channel is set up for the emergency call connection such that if all of the plurality of telecommunications channels available in the cordless base station are occupied, one of the plurality of telecommunications channels is freed.

6. A method as claimed in claim 1, wherein the telecommunications channel includes both a radio channel between the cordless base station and the cordless mobile part and a voice/data channel between the cordless base station and the emergency call service point.

7. A method as claimed in claim 1, wherein the established emergency call connection within the cordless telecommunications system is cleared down by the cordless base station.

8. A method as claimed in claim 1, further includes the steps of:
    transmitting additional information by cordless base stations wherein the information is received by cordless mobile parts and indicates that the emergency calls can be passed onto the emergency call service points via the cordless base stations; and
    synchronizing first cordless mobile parts, which receive the additional information from first cordless base stations, and to which the first cordless mobile parts do not have any access authorization, as a precaution for making emergency calls, at least temporarily with the first cordless base stations for a telecommunication which is restricted to making emergency calls.

9. A method as claimed in claim 1 wherein the cordless telecommunications system is a DECT/GAP system.

10. A method as claimed in claim 1, wherein the cordless telecommunications system is a PHS system.

11. A method as claimed in claim 1, wherein the cordless telecommunications system is a WACS system.

12. A method as claimed in claim 1, wherein the cordless telecommunications system is a PACS system.

13. A method as claimed in claim 1, wherein the cordless telecommunications system is a CDMA system.

14. A method as claimed in claim 1, wherein the cordless telecommunications system is a TDMA system.

15. A method as claimed in claim 1, wherein the cordless telecommunications system is an FDMA system.

16. A method as claimed in claim 1, wherein the cordless telecommunications system is a hybrid system of a CDMA system, a TDMA system and an FDMA system.

* * * * *